(12) United States Patent
Fujimoto et al.

(10) Patent No.: US 6,820,484 B2
(45) Date of Patent: Nov. 23, 2004

(54) VIBRATING GYROSCOPE AND ELECTRONIC DEVICE USING THE SAME

(75) Inventors: Katsumi Fujimoto, Toyama-ken (JP); Keiichi Okano, Toyama (JP); Masato Koike, Toyama-ken (JP); Hironari Yamamoto, Toyama-ken (JP)

(73) Assignee: Murata Manufacturing Co, Ltd., Kyoto (JP)

( * ) Notice: Subject to any disclaimer, the term of this patent is extended or adjusted under 35 U.S.C. 154(b) by 0 days.

(21) Appl. No.: 10/395,146

(22) Filed: Mar. 25, 2003

(65) Prior Publication Data

US 2003/0217609 A1 Nov. 27, 2003

(30) Foreign Application Priority Data

Mar. 25, 2002 (JP) ........................................ 2002-083962

(51) Int. Cl.[7] .............................. G01P 9/04; G01C 19/00
(52) U.S. Cl. ................... 73/504.12; 73/504.14
(58) Field of Search ..................... 73/504.04, 504.12, 73/504.13, 504.14, 504.15, 504.16

(56) References Cited

U.S. PATENT DOCUMENTS

| 4,694,696 A | * | 9/1987 | Hojo et al. ................... 73/497 |
| 5,434,365 A | * | 7/1995 | Mori et al. ................... 174/262 |
| 5,434,467 A | * | 7/1995 | Abe et al. ................... 310/366 |

FOREIGN PATENT DOCUMENTS

| JP | 2001-227953 | | 8/2001 |
| JP | 2002-216863 | * | 6/2002 |

* cited by examiner

*Primary Examiner*—Helen Kwok
(74) *Attorney, Agent, or Firm*—Keating & Bennett, LLP

(57) ABSTRACT

A vibrator that produces bending vibration with both ends unsupported is mounted on one principal surface of a mounting board, and a driving-and-detecting circuit component is also mounted to cross over an antinode center line of bending vibration of the mounting board due to resonance. The original self-resonance frequency of bending vibration of the mounting board itself is lower than the frequency of bending vibration of the vibrator. The modified self-resonance frequency of bending vibration of the mounting board when the vibrator and the driving-and-detecting circuit component are mounted thereon is higher than the original self-resonance frequency, and does not coincide with the frequency of bending vibration of the vibrator.

20 Claims, 5 Drawing Sheets

VIBRATING GYROSCOPE AND ELECTRONIC DEVICE USING THE SAME

BACKGROUND OF THE INVENTION

1. Field of the Invention

The present invention relates to a vibrating gyroscope and an electronic device using the gyroscope, for example, a vibrating gyroscope for use in a camera-shake correction device provided in a video camera, and other apparatuses using such a gyroscope.

2. Description of the Related Art

For example, Japanese Unexamined Patent Application Publication No. 2001-227953 discloses in FIG. 6 thereof a vibrating gyroscope in which a prismatic vibrator that exhibits bending vibration with two free ends is mounted on one major surface of a mount board while nodes of the vibrator are supported by support members so that the longitudinal direction of the vibrator is parallel to the major surface of the mount board.

In such a known vibrating gyroscope, the vibrator is mounted on one major surface of the mount board such that the nodes of the vibrator are supported by the support members. Electronic components that define a driving circuit and a detection circuit are also mounted on the mount board. After the resonance frequency of the vibrator, the functions of the driving circuit and the detection circuit, and so on are adjusted, a cover is attached to the mount board, thereby completing the vibrating gyroscope.

In the above-described vibrating gyroscope, it is quite difficult to prevent bending vibration of the vibrator, which is caused by excitation of the driving circuit, from propagating to the mount board through the support members. When the vibration of the vibrator propagates to the mount board, the mount board itself sometimes resonates with the vibrator and exhibits bending vibration. Although bending vibration of the mount board is substantially reduced by attaching the cover to the mount board, the cover is attached after the resonance frequency and the functions of the circuits are adjusted in order to simplify the adjustment operation. For this reason, even when the characteristics of the vibrating gyroscope are optimally adjusted in a state in which bending vibration of the mount board is strong before the cover is attached, when bending vibration of the mount board is reduced by attaching the cover, the characteristics deviate from the optimum state.

Bending vibration of the mount board due to resonance caused by the propagation of bending vibration of the vibrator increases as the self-resonance frequency of the mount board is decreased, as shown in FIG. 2. Furthermore, the mount board generates a strong vibration when the self-resonance frequency thereof coincides with the frequency of bending vibration of the vibrator, as similarly shown in FIG. 2.

In general, the self-resonance frequency of the mount board is determined by the material and the size, such as thickness and length, of the mount board. Since the degree of flexibility in designing the material and length of the mount board is often low due to price and size, the self-resonance frequency is optimally determined by the thickness of the mount board in most cases. Since the self-resonance frequency increases as the thickness increases, the thickness is generally selected such that the self-resonance frequency is higher than the vibration frequency of the vibrator.

However, increasing the thickness of the mount board results in an increase in height of the vibrating gyroscope itself, and this does not satisfy recent demands for low-profile electronic devices.

SUMMARY OF THE INVENTION

To overcome the problems described above, preferred embodiments of the present invention provide a low-profile vibrating gyroscope having a thin mounting board and which prevents the characteristics from changing when the characteristics are adjusted before a cover is attached to the mount board and when the vibrating gyroscope is completed after the cover is attached.

According to a preferred embodiment of the present invention, a vibrating gyroscope includes a mounting board having a first principal surface and a second principal surface, a vibrator having nodes and mounted on the first principal surface of the mounting board to produce bending vibration with both ends unsupported, support members for supporting the vibrator at the nodes such that the longitudinal direction of the vibrator is substantially parallel to the first principal surface of the mounting board, driving-and-detecting circuit components mounted on the first principal surface of the mounting board, and a cover that is mounted on the mounting board after the vibrator and the driving-and-detecting circuit components are mounted. An original self-resonance frequency of bending vibration of the mounting board itself is lower than the frequency of bending vibration of the vibrator, and a modified self-resonance frequency of bending vibration of the mounting board when the vibrator and the driving-and-detecting circuit components but not the cover are not mounted thereon is higher than the original self-resonance frequency of bending vibration of the mounting board itself, and does not coincide with the frequency of bending vibration of the vibrator.

Preferably, the modified self-resonance frequency of bending vibration of the mounting board is higher than the frequency of bending vibration of the vibrator.

Preferably, at least one of the driving-and-detecting circuit components is mounted so as to cross over an antinode center line of bending vibration of the mounting board due to resonance. Furthermore, preferably, the driving-and-detecting circuit component mounted to cross over the antinode center line of bending vibration of the mounting board is a bare chip IC.

In the vibrating gyroscope having such features, vibration of the mounting board is effectively suppressed, and the characteristics of the vibrating gyroscope are prevented from deviating from the optimum state when the cover is attached. Moreover, the characteristics of the vibrating gyroscope do not substantially differ when the characteristics are adjusted before a cover is attached to the mounting board and when the vibrating gyroscope is completed after the cover is attached, and variations of the characteristics are greatly reduced. In addition, since a thin mounting board is used, a low-profile vibrating gyroscope is achieved.

According to another preferred embodiment of the present invention, an electronic device includes the above-described vibrating gyroscope of other preferred embodiments of the present invention.

Since the electronic device includes the novel vibrating gyroscope, accurate information regarding the angular velocity is consistently obtained and performance is greatly improved.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
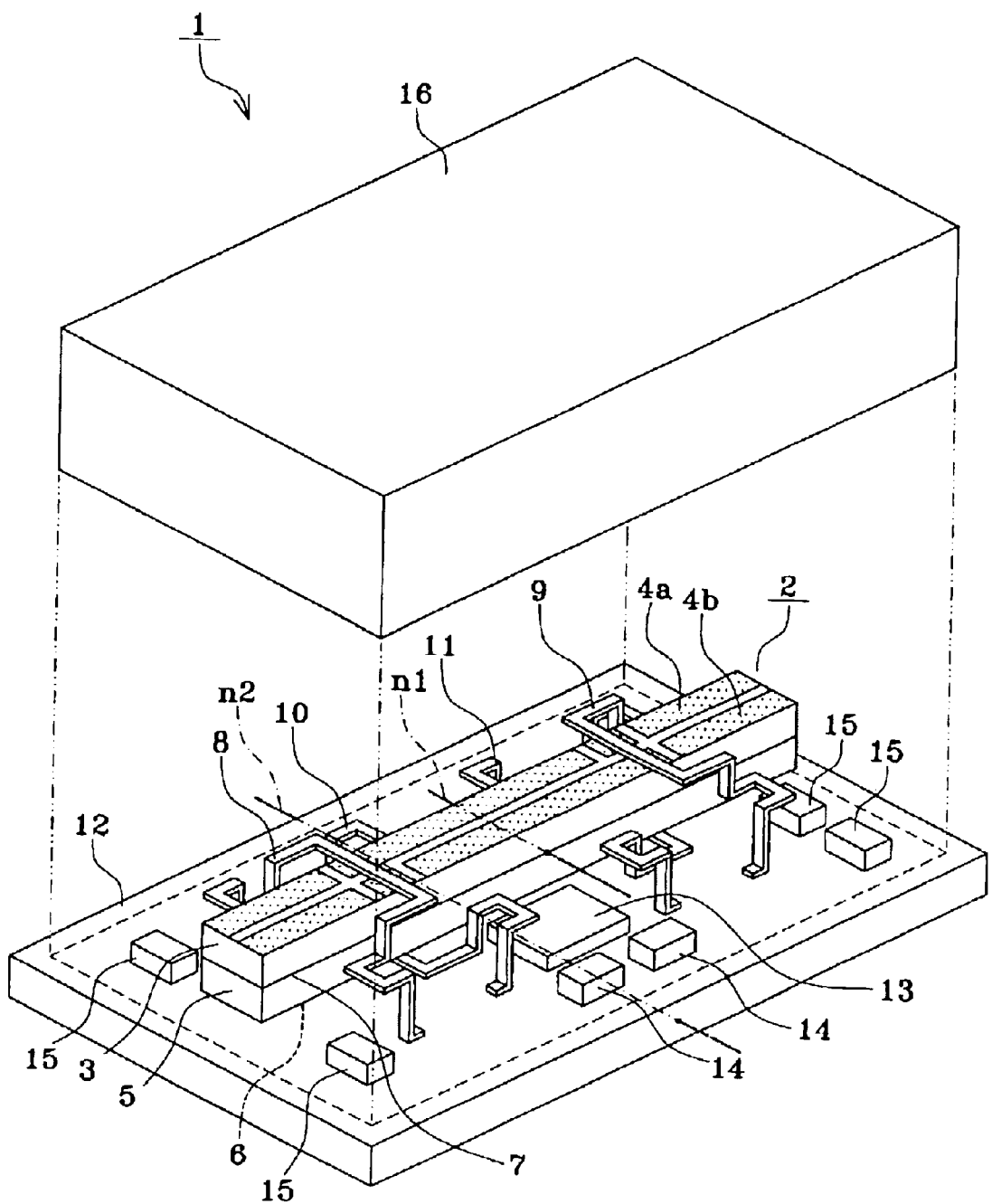
FIG. 1 is an exploded perspective view of a vibrating gyroscope according to a preferred embodiment of the present invention.

FIG. 1 is a perspective view of a vibrating gyroscope according to a preferred embodiment of the present invention. Referring to FIG. 1, a vibrating gyroscope 1 includes a vibrator 2, conductive support members 8, 9, 10, and 11, for example, shaped like a plate and made of a Fe—Ni alloy or metal such as phosphor bronze, a mounting board 12, driving-and-detecting circuit components 13, 14, and 15 that excite the vibrator 2 for bending vibration and that detect the angular velocity to be applied to the vibrator 2 on the basis of a signal output from the vibrator 2, and a cover 16.

The vibrator 2 has a bimorph structure in which a piezoelectric plate 3, which is polarized in the thickness direction and which has electrodes 4a and 4b that are separate in the widthwise direction provided on a first principal surface, and a piezoelectric plate 5, which is polarized in the thickness direction and which has an electrode 6 provided on a first principal surface, are bonded such that second principal surfaces thereof face each other with an electrode 7 provided therebetween. In the bonded state, the directions of polarization of the piezoelectric plate 3 and the piezoelectric plate 5 are opposite to each other. The first principal surface of the piezoelectric plate 3 and the first principal surface of the piezoelectric plate 5 define an upper principal surface and a lower principal surface of the vibrator 2, respectively. The widthwise direction, longitudinal direction, thickness direction of the vibrator 2 correspond to the widthwise direction, longitudinal direction, thickness direction of the piezoelectric plates 3 and 5, respectively. Each of the electrodes 4a and 4b is divided in the longitudinal direction into three regions, namely, a main region, a first end region, and a second end region. Each of the electrodes 6 and 7 is preferably defined by a full surface electrode. Since a detailed configuration of the vibrator 2 is not critical in the present invention, a further description of the configuration of the vibrator 2 is omitted.

The driving-and-detecting circuit components 13, 14, and 15 are mounted on a first surface of the mounting board 12 to define a driving circuit for exciting the vibrator 2 for bending vibration, an angular-velocity detecting circuit for detecting bending vibration based on the Coriolis force of the vibrator 2, and other suitable circuits. Among these components, the component 13 is a bare chip IC in which active elements are integrated. The entire bottom surface of the component 13 is bonded to the principal surface of the mounting board 12 with an adhesive or other suitable material, and is coated with resin. The other components 14 and 15 are discrete chips such as a monolithic chip capacitor and a chip resistor.

The vibrator 2 produces bending vibration in the thickness direction with both ends thereof unsupported in response to a driving signal applied to the electrodes 4a and 4b or the electrode 6. In this case, two axes functioning as node axes of vibration extend through the vibrator 2 in the widthwise direction at a distance corresponding to approximately 0.224 times the length of the vibrator 2 from both ends of the vibrator 2 and at the center in the thickness direction (at the position of the electrode 7). Portions adjacent to the node axes are referred to as "nodes". One axis extending through the vibrator 2 in the widthwise direction at the center in the longitudinal direction functions as an antinode of bending vibration, and therefore, is referred to as an "antinode center line n1".

The support members 8 and 10 are mechanically fixed to and electrically connected to the electrodes 4a and 4b and the electrode 6 on the upper principal surface and the lower principal surface of the vibrator 2 adjacent to one of the nodes with solder or a conductive adhesive. Similarly, the support members 9 and 11 are mechanically fixed to and electrically connected to the electrodes 4a and 4b and the electrode 6 on the upper principal surface and the lower principal surface of the vibrator 2 adjacent to the other node. More specifically, the support member 8 is fixed to a portion of the electrode 4a adjacent to an end of the main region and to a portion of the electrode 4b adjacent to an end of the first end region, and the support member 9 is fixed to a portion of the electrode 4a adjacent to an end of the second end region and to a portion of the electrode 4b adjacent to an end of the main region. The ends of the support members 8 and 10 are electrically and mechanically fixed to electrodes provided on the first principal surface of the mounting board 12. The ends of the support members 9 and 11 are also electrically and mechanically fixed to electrodes disposed on the principal surface of the mounting board 12.

Accordingly, the nodes of the vibrator 2 are supported on the principal surface of the mounting board 12 by the support members 8, 9, 10, and 11 such that the longitudinal direction of the vibrator 2 is substantially parallel to the principal surface of the mounting board 12. For this reason, the antinode center line n1 of the vibrator 2 is also substantially parallel to the principal surface of the mount board 12.

The support members 8 and 9 are electrically insulated from each other, and are define lead wires for the main regions of the electrodes 4a and 4b. The support member 10 and 11 are connected to the electrode 6, and define lead wires for the electrode 6.

Each of the support members 8, 9, 10, and 11 includes a plurality of bent portions between a portion fixed to the vibrator 2 and portions fixed to the mount board 12. Since the bent portions function as cushions, vibration of the vibrator 2 is not substantially suppressed, but is stabilized. Moreover, leakage of the vibration of the vibrator 2 to the mounting board 12 is greatly reduced.

In the vibrating gyroscope 1 having such a configuration, since the vibrator 2 is supported on the mounting board 12 by the support members 8, 9, 10, and 11 having the bent portions, vibration of the vibrator 2 is less prone to leak outside, and is stabilized, and the accuracy of the detections of the angular velocity is greatly increased.

A description will now be given of the characteristic features of the vibrating gyroscope according to various preferred embodiments of the present invention.

Figure 3A:
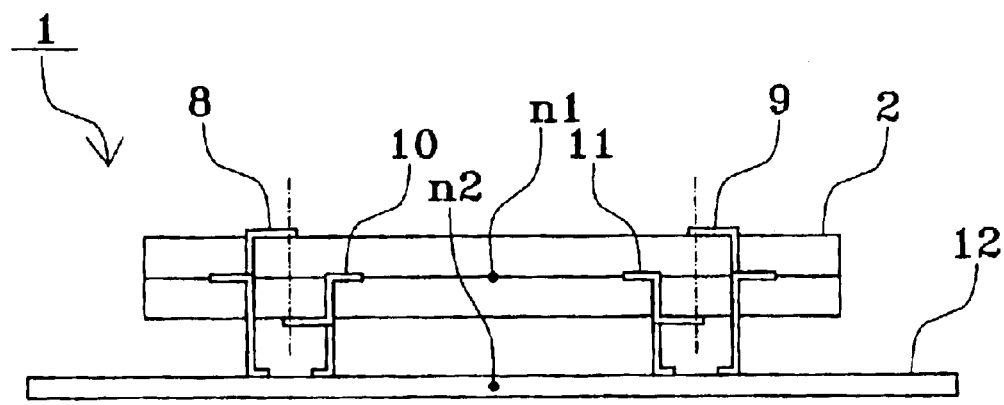
FIGS. 3A to 3C are side views showing a bending state of a vibrator and a mount board in the vibrating gyroscope shown in FIG. 1.
Figure 3B:
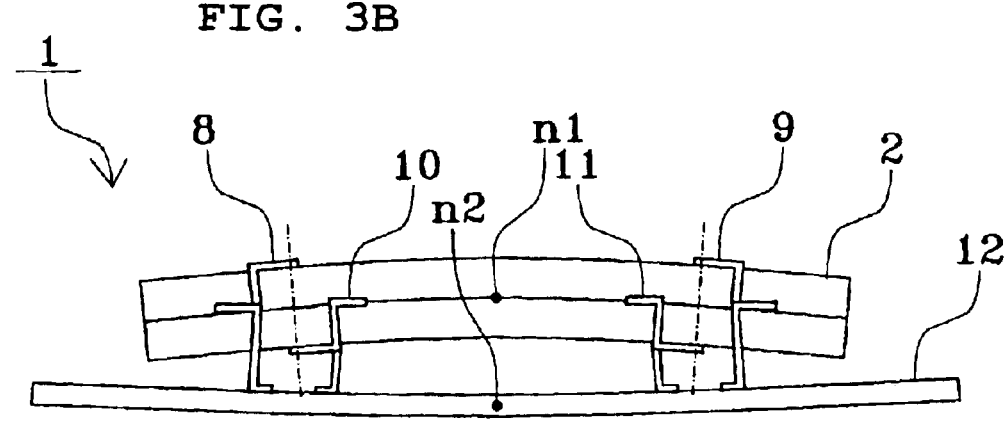
Figure 3C:
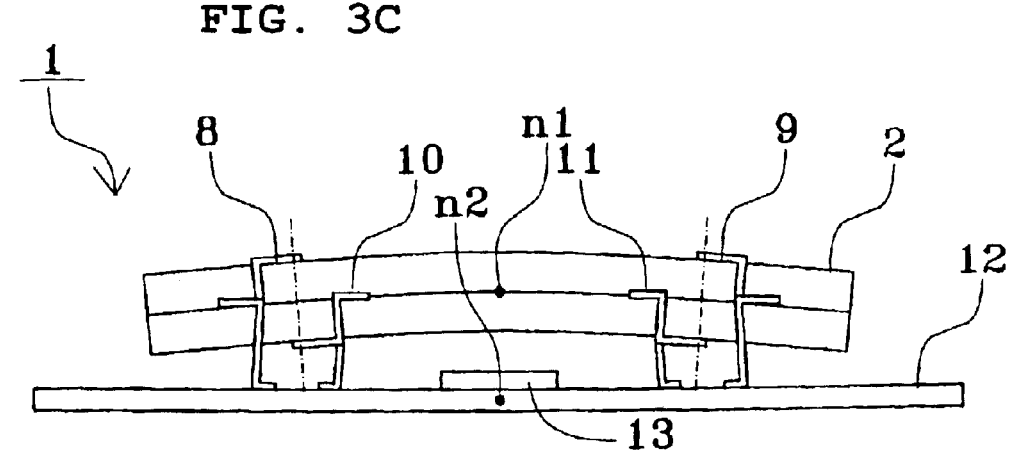

FIGS. 3A to 3C are side views of the vibrating gyroscope 1 before the cover 16 is attached thereto. FIG. 3A shows a state in which the vibrator 2 is not vibrating. In FIG. 3A, the driving-and-detecting circuit components 13, 14, and 15 provided on the first principal surface of the mounting board 12 are not shown. Since bending vibration of the vibrator 2 does not occur, bending vibration of the mounting board 12 is not caused by resonance.

FIG. 3B shows a state of bending vibration of the vibrator 2 (an instant at which the vibrator 2 is bent) where it is assumed that the driving-and-detecting circuit components 13, 14, and 15 are not mounted on the principal surface of the mounting board 12. As is evident from FIG. 3B, when the vibrator 2 produces bending vibration, the vibration is transmitted to the mounting board 12 through the support members 8, 9, 10, and 11, and the mounting board 12 also produces bending vibration because of resonance. Since the original self-resonance frequency of the mounting board 12 itself is determined by the material and size such that it is lower than the frequency of bending vibration of the vibrator 2, as shown by a point A in FIG. 2, the mounting board 12 is bent by resonance to a relatively large extent. In this case, while the mounting board 12 also has an antinode where the amplitude is the largest, an antinode center line n2 bending vibration of the mounting board 12 is located at a position shifted parallel to the antinode center line n1 of bending vibration of the vibrator 2.

Figure 4:
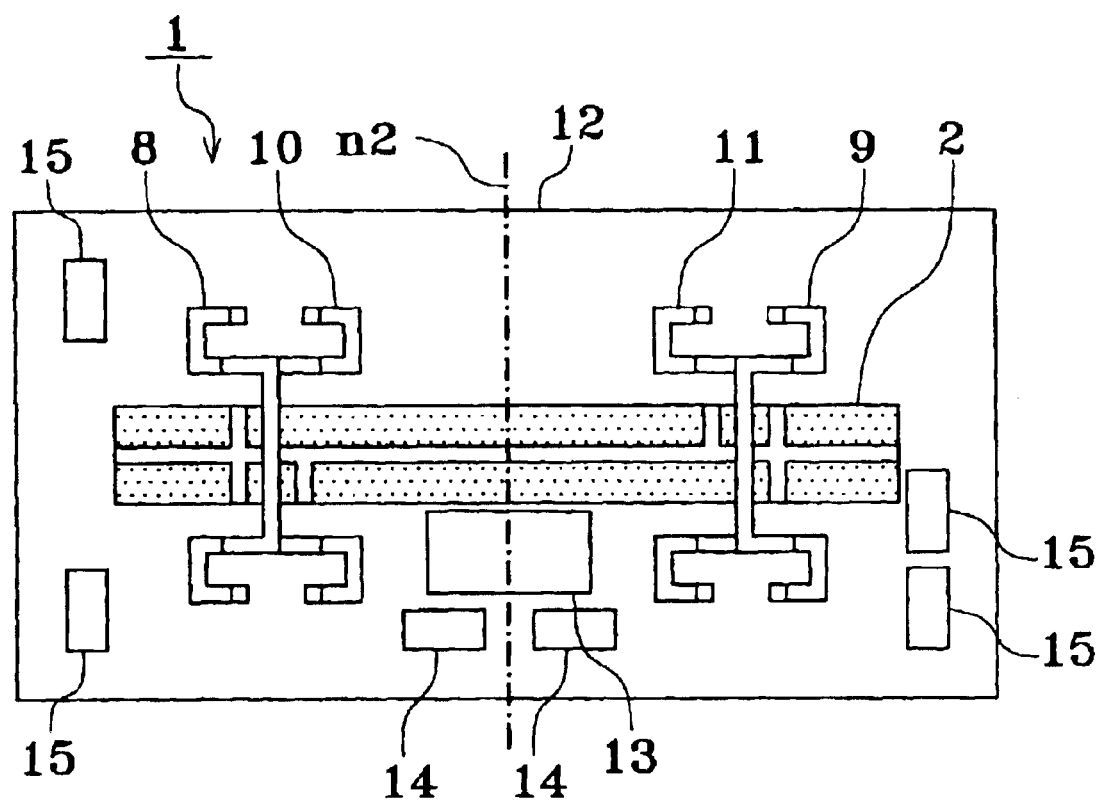
FIG. 4 is a plan view of the vibrating gyroscope shown in FIG. 1 before a cover is mounted thereon.

FIG. 3C shows a state of bending vibration of the vibrator 2 (an instant at which the vibrator 2 is bent) when the driving-and-detecting circuit component 13 is mounted on the first principal surface of the mounting board 12. As shown in FIG. 4 as a plan view of the vibrating gyroscope 1, the component 13 is mounted on the principal surface of the mounting board 12 such that it crosses over the antinode center line n2 of bending vibration. While the original self-resonance frequency of bending vibration of the mounting board 12 itself is lower than the frequency of bending vibration of the vibrator 2, rigidity with respect to bending is increased by mounting the component 13 on the principal surface, and as a result, the self-resonance frequency of the mounting board 12 exceeds the frequency of bending vibration of the vibrator 2, as shown by a position A' in FIG. 2. In this case, in particular, the rigidity of the mounting board 12 is substantially increased by the driving-and-detecting circuit component 13 that is mounted to cross over the antinode center line n2 of bending vibration of the mounting board 12, and the self-resonance frequency is thereby increased. That is, since the entire bottom surface of the bare chip IC which defines the driving-and-detecting circuit component 13 is bonded to the principal surface of the mounting board 12 with an adhesive or other suitable material and is coated with resin, a force capable of bending the bare chip IC itself is needed to bend the portion of the mounting board 12 to which the bare chip IC is bonded. Thus, the rigidity of the mounting board 12 is greatly increased. When the self-resonance frequency of the mounting board 12 exceeds the frequency of bending vibration of the vibrator 2, the mounting board 12 is much less prone to be bent by the frequency of bending vibration, and the degree of bending thereof is decreased, although the degree of bending of the vibrator 2 is not substantially changed.

In this way, in the vibrating gyroscope 1 of preferred embodiments of the present invention, by mounting the driving-and-detecting circuit component 13 on the first principal surface of the mounting board 12 to cross over the antinode center line n2 of bending vibration, the substantial self-resonance frequency of the mounting board 12 is substantially increased to suppress vibration due to resonance. For this reason, the characteristics of the vibrating gyroscope 1 do not substantially differ before and after the cover 16 is attached, and are prevented from deviating from the optimum state by attaching the cover 16. This greatly reduces variations of the characteristics of the vibrating gyroscope 1. Since the mounting board 12 may have a reduced thickness, a low rigidity, and a self-resonance frequency lower than the frequency of bending vibration of the vibrator 2, the height of the vibrating gyroscope 1 is greatly decreased. Even if there is no need to reduce the thickness of the mounting board 12, it is unnecessary to select a material having a high Young's modulus in order to increase the rigidity of the mount board 12. Therefore, the degree of flexibility in selecting the material of the mounting board 12 is greatly increased. Consequently, it is possible to use an inexpensive material which greatly reduces the cost of the vibrating gyroscope.

While the entire bottom surface of the bare chip IC is bonded to the first principal surface of the mounting board 12 in the above-described preferred embodiment, it may be bonded by flip chip bonding. In this case, since a gap between the bare chip IC and the mount board 12 is filled with underfill resin, a structure substantially similar to a structure in which the bottom surface is bonded with resin is provided.

The driving-and-detecting circuit component that crosses over the center line of bending vibration of the mount board 12 is not limited to the bare chip IC, and may include a packaged IC or a discrete chip component such as a monolithic chip capacitor or a chip resistor. In this case, however, when lead terminals protrude from the main body, they function as cushions and the rigidity of the mounting board may not be increased. Therefore, it is preferable that the bottom surface of the component is in tight contact with the surface of the mounting board while external electrodes provided on the bottom surface of the component are used as terminals. Ball grid array (BGA) and land grid array (LGA) packages provide very similar advantages.

Figure 2:
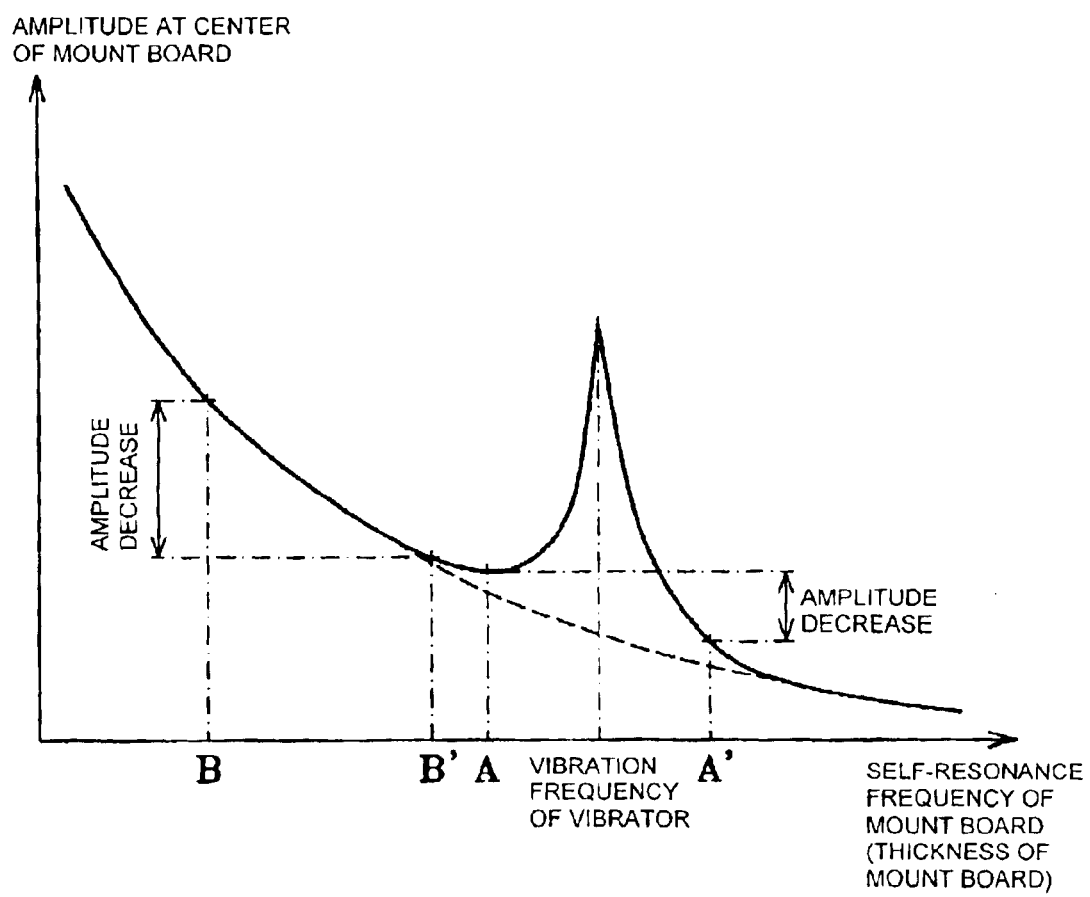
FIG. 2 is a characteristic view showing the relationship between the self-resonance frequency and the vibration amplitude due to resonance of a mount board in a vibrating gyroscope.

In the above-described preferred embodiment, the original self-resonance frequency of bending vibration of the mounting board 12 is lower than the frequency of bending vibration of the vibrator 2, and the modified self-resonance frequency of bending vibration of the mounting board 12 when the vibrator 2 and the driving-and-detecting circuit component 13 are mounted thereon is higher than the frequency of bending vibration of the vibrator 2. However, the same advantages are achieved as long as the modified self-resonance frequency of the mounting board 12 is higher than the original self-resonance frequency. For example, even when the original self-resonance frequency of bending vibration of the mounting board itself shown by a point B in FIG. 2 is changed to a point B' in FIG. 2 by mounting the vibrator and the driving-and-detecting circuit component on the mounting board, the amplitude of bending vibration of the mounting board is decreased. Therefore, it is also possible to provide similar advantages, for example, reduction of variations of the characteristics, low profile, and low cost.

However, there is an exceptional condition in which the modified self-resonance frequency of bending vibration of the mounting board 12 after the vibrator 2 and the driving-and-detecting circuit component 13 are mounted thereon almost coincides with the frequency of bending vibration of the vibrator 2. In this case, conversely, the amplitude of bending vibration of the mounting board 12 may be increased by mounting the vibrator 2 and the driving-and-detecting circuit component 13, as shown in FIG. 2, which results in an adverse effect. Therefore, such a condition is not included in the present invention.

While the vibrator is preferably shaped like a quadrangular prism having a bimorph structure in the above-described preferred embodiment, the shape of the vibrator is not limited to the quadrangular prism. The vibrator may be shaped like a cylinder, a triangular prism, or a polyangular prism having five or more corners, or may have other suitable shapes.

The shape of the support members is not limited to a substantially linear shape as in the above-described preferred embodiment, for example, the shape of the support members may be a ring that surrounds the nodes of the vibrator as long as the support members support the vibrator on the first principal surface of the mounting board.

Figure 5:
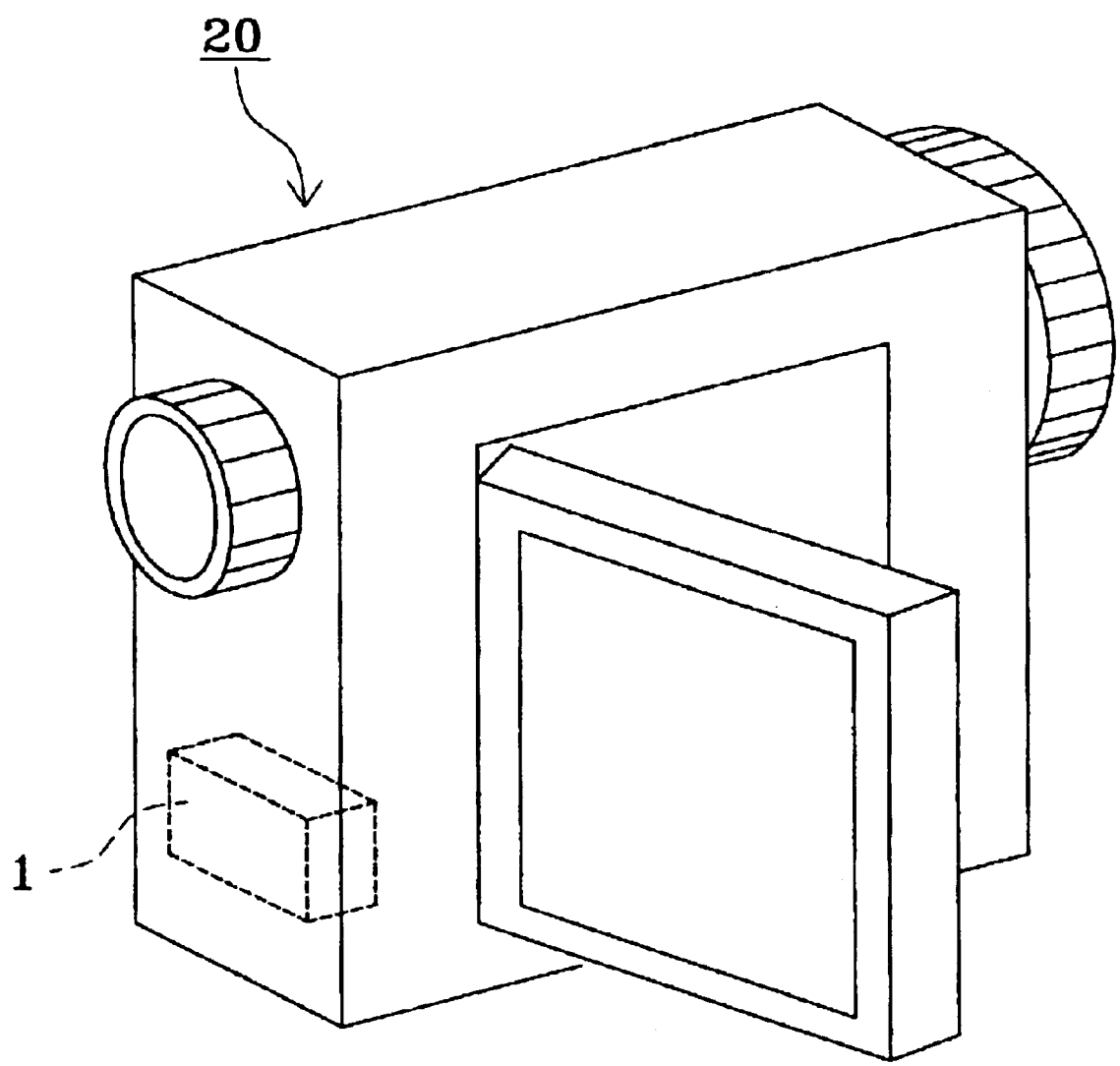
FIG. 5 is a perspective view of an electronic device according to another preferred embodiment of the present invention.

FIG. 5 is a perspective view of a video camera as an electronic device according to another preferred embodiment of the present invention. Referring to FIG. 5, a video camera 20 includes the vibrating gyroscope 1 according to the above-described preferred embodiments of the present invention for camera-shape prevention.

Since the video camera 20 includes the vibrating gyroscope according to other preferred embodiments of the present invention, accurate information about the angular velocity is consistently obtained, and the performance is greatly improved.

The electronic device of the present invention is not limited to the video camera, and may include all electronic devices having a vibrating gyroscope, such as a digital camera similarly using a vibrating gyroscope for camera-shake prevention, a navigation system using a vibrating gyroscope for position detection, and a rollover detection system for an automobile.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A vibrating gyroscope comprising;
   a mounting board having a first principal surface and a second principal surface;
   a vibrator having nodes and being mounted on said first principal surface of said mounting board to produce bending vibration with both ends of the vibrator being unsupported;
   support members for supporting said vibrator at said nodes such that the longitudinal direction of said vibrator is substantially parallel to said first principal surface of said mounting board;
   driving-and-detecting circuit components mounted on said first principal surface of said mounting board; and
   a cover that is mounted on said mounting board after said vibrator and said driving-and-detecting circuit components are mounted on said mounting board; wherein
   an original self-resonance frequency of bending vibration of said mounting board itself is lower than a frequency of bending vibration of said vibrator, and
   a modified self-resonance frequency of bending vibration of said mounting board when said vibrator and said driving-and-detecting circuit components are mounted and said cover is not mounted on said mounting board is higher than the original self-resonance frequency of bending vibration of said mounting board itself, and does not coincide with the frequency of bending vibration of said vibrator.

2. The vibrating gyroscope according to claim 1, wherein the modified self-resonance frequency of bending vibration of said mounting board is higher than the frequency of bending vibration of said vibrator.

3. The vibrating gyroscope according to claim 1, wherein at least one of said driving-and-detecting components is mounted so as to cross over an antinode center line of bending vibration of said mounting board due to resonance.

4. The vibrating gyroscope according to claim 3, wherein said at least one of said driving-and-detecting components is a bare chip IC.

5. The vibrating gyroscope according to claim 1, wherein said supporting members include a plurality of bent portions between ends thereof to stabilize vibration of the vibrator.

6. The vibrating gyroscope according to claim 1, wherein at least one of said driving-and-detecting circuit components is defined by a bare chip integrated chip.

7. The vibrating gyroscope according to claim 1, wherein at least one of said driving-and-detecting circuit components is a discrete chip.

8. The vibrating gyroscope according to claim 1, wherein said vibrator has a quadrangular prism shape.

9. The vibrating gyroscope according to claim 1, wherein said vibrator has a bimorph structure including first and second piezoelectric plates which are polarized in a thickness direction, and an electrode provided between said first and second piezoelectric plates.

10. The vibrating gyroscope according to claim 9, wherein the first and second piezoelectric plates are polarized in opposite directions.

11. An electronic device including a vibrating gyroscope wherein said vibrating gyroscope comprises:
    a mounting board having a first principal surface and a second principal surface;
    a vibrator having nodes and being mounted on said first principal surface of said mounting board to exhibit bending vibration with both ends of the vibration being unsupported;
    support members for supporting said vibrator at said nodes such that the longitudinal direction of said vibrator is substantially parallel to said first principal surface of said mounting board;
    driving-and-detecting circuit components mounted on said first principal surface of said mounting board; and
    a cover that is mounted on said mounting board after said vibrator and said driving-and-detecting circuit components are mounted; wherein
    an original self-resonance frequency of bending vibration of said mounting board itself is lower than a frequency of bending vibration of said vibrator; and
    a modified self-resonance frequency of bending vibration of said mounting board when said vibrator and said driving-and-detecting circuit components are mounted and said cover is not mounted on said mounting board is higher than the original self-resonance frequency of bending vibration of said mounting board itself, and does not coincide with the frequency of bending vibration of said vibrator.

12. The electronic component according to claim 11, wherein the modified self-resonance frequency of bending vibration of said mounting board is higher than the frequency of bending vibration of said vibrator.

13. The electronic component according to claim 11, wherein at least one of said driving-and-detecting components is mounted so as to cross over an antinode center line of bending vibration of said mounting board due to resonance.

14. The electronic component according to claim 13, wherein said at least one of said driving-and-detecting components is a bare chip IC.

15. The electronic component according to claim 11, wherein said supporting members include a plurality of bent portions between ends thereof to stabilize vibration of the vibrator.

16. The electronic component according to claim 11, wherein said driving-and-detecting circuit components are defined by a bare chip integrated chip.

17. The electronic component according to claim 11, wherein at least one of said driving-and-detecting circuit components is a discrete chip.

18. The electronic component according to claim 11, wherein said vibrator has a quadrangular prism shape.

19. The electronic component according to claim 11, wherein said vibrator has a bimorph structure including first and second piezoelectric plates which are polarized in a thickness direction, and an electrode provided between said first and second piezoelectric plates.

20. The electronic component according to claim 19, wherein the first and second piezoelectric plates are polarized in opposite directions.

* * * * *